Oct. 24, 1944.    W. L. CARLSON    2,361,086
AUTOMATIC CLUTCH CONTROLLED PRIME MOVER

Filed July 20, 1942

INVENTOR
WILLIAM L. CARLSON
BY
Wheeler, Wheeler & Wheeler
ATTORNEYS.

Patented Oct. 24, 1944

2,361,086

UNITED STATES PATENT OFFICE 2,361,086

AUTOMATIC CLUTCH CONTROLLED PRIME MOVER

William L. Carlson, Green Bay, Wis.

Application July 20, 1942, Serial No. 451,594

9 Claims. (Cl. 103—23)

This invention relates to improvements in automatic clutch controlled prime movers.

Broadly, it is an object of the invention to provide remote controlled means for the actuation of the clutch of a prime mover irrespective of how such clutch is actuated and irrespective of the nature of the prime mover or the mechanism driven thereby. More particularly, however, the invention seeks to provide a novel and improved control for the heavy clutches of such engines as Diesel engines with a novel arrangement by which a governor connected with the engine controls an auxiliary motor for shifting the clutch in accordance with the speed of the Diesel engine.

A very important object of the invention is to provide means whereby no power is used by the control system except as actually required for clutch shifting purposes.

Specifically, the invention has particular application to various systems of the general type of that described herein as a preferred exemplification. In this case the Diesel engine serving as a prime mover is made to operate a pump. The engine operates continuously, it having been found that this is more economical than to start and stop an engine of this type. When the engine is required to operate the pump, its speed must be increased sufficiently to handle the pumping load. At other times the engine idles. The application of the invention to such an installation enables the clutch between the engine and the pump to be disengaged while the engine is idle and to be engaged automatically when the engine speed is increased by a float actuated speed control, such as a throttle valve.

Another objective of the invention is to provide for the electric control of an auxiliary clutch shifting motor through a three way switch circuit and associated mechanism such as to interrupt all power transmission at each extreme of clutch engaging and disengaging movement so that the entire control system is inactive until further clutch movement is required.

While the invention and some of the aforesaid objectives have been stated with reference to a particular construction, it will be understood that certain features of the invention are also applicable to many remote control installations for marine and other purposes. These and other objectives of the invention will be apparent to those skilled in the art upon study of the following disclosures.

In the drawing.

Like parts are identified by the same reference characters throughout the several views.

Figure 1:
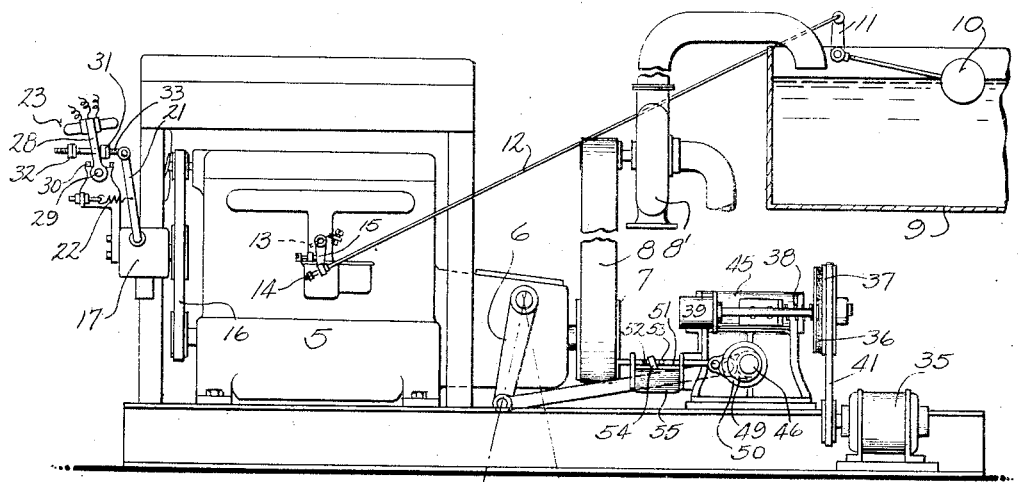
Fig. 1 is a view partially diagrammatic and partially in side elevation, illustrating an installation embodying the invention.
Figure 2:
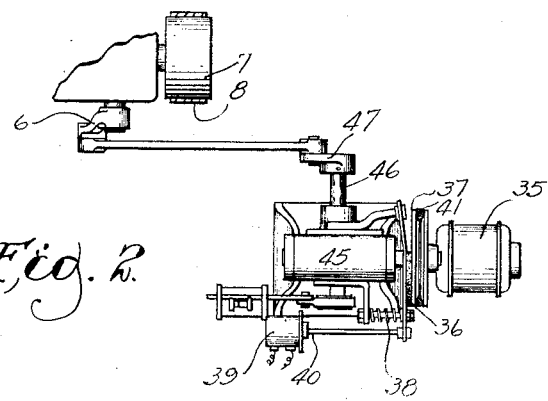
Fig. 2 is a fragmentary detail in plan of a portion of the apparatus shown in Fig. 1.

The prime mover 5 may, as above indicated, be of any type, but the invention has particular application to Diesel or semi-Diesel engines having heavy clutches requiring substantial power for the shifting of the clutch lever 6 which controls transmission of motion from the engine 5 to the pulley 7 which drives belt 8 for the operation of a pump 8' to elevate a liquid into the tank 9 to a height determined by the float 10. The liquid in this instance represents the work upon which the prime mover operates, in the final analysis. The float has connections by means of lever 11 and link 12 with a speed controller for the engine 5, here exemplified by the throttle valve 13. With the throttle valve in the position of minimum opening in which it is illustrated in Fig. 1, the engine is understood to be in operation at idling speeds at which the load represented here merely by the driven belt at 8 must be disconnected from the prime mover by the clutch lever 6. When the reduced level of liquid in the tank 9 allows the float 10 to drop from the position illustrated in Fig. 1, the head 14 at the end of link 12 will ultimately engage the throttle valve lever 15 to move the throttle valve to its open position, thereby accelerating the engine and requiring that the clutch lever 6 be shifted to clutch engaging position in order that the engine may pick up the load represented by belt 8. As above indicated, the organization diagrammatically illustrated merely exemplifies one use to which features of the invention may be put.

Figure 3:
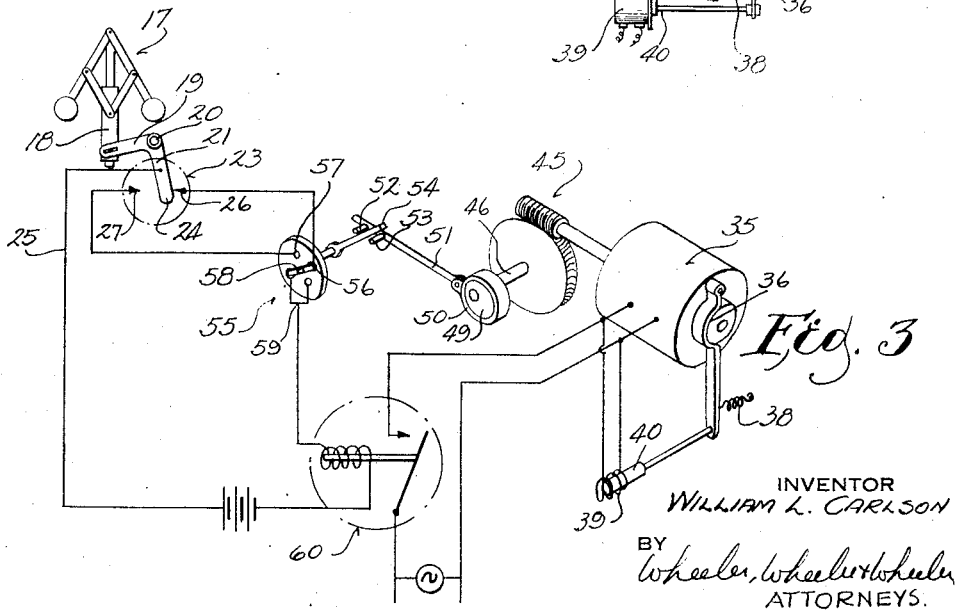
Fig. 3 is a diagrammatic view of portions of the apparatus and the electrical circuits involved.

Connected to be driven by the shaft belt 16 of the engine, is a conventional governor 17 which may be of the fly ball type illustrated in Fig. 3, wherein the weights are connected to a sleeve 18 which operates the arm 19 of a rock shaft 20 to move lever 21. As shown in Fig. 1, the lever 21 is subject to the adjustable bias of a tension spring 22 which opposes the outward movement of the governor weights and tends to maintain the three way switch 23 closed in one position.

As illustrated in Fig. 1 (and used in practice)

the switch may comprise a mercury type switch. As more conventionally illustrated in Fig. 3, the switch contact 24 to which conductor 25 is connected, is normally engaged, in accordance with its bias, with stationary contact 26. When the engine reaches a predetermined speed the outward movement of the governor weights, acting through sleeve 18 and the intervening linkage, will cause the switch contactor 24 to move into engagement with stationary contact 27. In the diagrammatic illustration of Fig. 3 the range of speeds between the one position and the other position of the moving switch contactor is represented by the spacing between the stationary contacts 26 and 27. In actual practice the device may be made to move with snap action, as well as lost motion, and this is represented in Fig. 1 by the arrangement whereby the switch assembly 23 is mounted on a lever 28 pivoted at 29 and arranged to move through a limited arc defined by stops 30. The weight of the switch assembly naturally tends to bias this lever 12 from its mid position either in one direction or the other, thus providing for the snap action.

Movement of the switch from either of its predetermined positions is provided for by the adjustable nuts 31 and 32 upon the rod 33 which is connected to the governor lever 21. As viewed in Fig. 1, movement of the governor lever to the right, in accordance with an increase of engine speed will ultimately engage the adjustable nut 32 with the switch supporting lever 28, thereby gradually raising such lever toward the vertical and ultimately forcing it beyond the vertical and allowing it to swing downwardly toward a right hand inclination equivalent to the left hand inclination illustrated. According to the diagrammatic illustration of Fig. 3, this will result in connecting the contactor 25 with contact 27 rather than contact 26.

The governor controlled movement of the contactor 24 of the switch assembly 23 controls the shifting of the engine clutch lever 6 in the following manner.

An auxiliary source of power is represented by the motor 35 normally maintained at rest by a brake 36 urged against pulley 37 by compression spring 38. Connected in series or parallel with the windings of motor 35, is a solenoid 39 having its armature 40 connected to the brake member 36 to release the brake when the motor is energized.

When the motor is energized its power is communicated to pulley 37 by a belt 41. Pulley 37 drives a speed reducer 45 having an output shaft 46 which carries a crank 47 connected by link 48 with the clutch shifting lever 6 of the prime mover 5. Thus, if the motor 35 were to remain in continuous operation it would continuously rotate the crank 47 to actuate the clutch lever back and forth continuously between its open and closed positions. It is, therefore, necessary to provide means such that the crank will stop at the conclusion of each 180 degrees of rotation to leave the clutch engaged or disengaged, as the case may be, pending further control from the governor.

To bring this about, shaft 46 also carries a cam or eccentric 49 having an eccentric strap 50 connected to a reciprocable rod 51 having spaced fingers 52 and 53 engaging the operating lever 54 of a three way snap switch 55.

The stationary terminals 56 and 57 of the snap switch 55 are conductively connected respectively with terminals 26 and 27 of the three way snap switch 23 which is governor controlled. The moving contactor 58 moves with snap action between positions in which it alternatively connects the respective fixed contacts 56 and 57 with the output terminal 59.

The power source is immaterial. Assuming that ordinary line power is available for the operation of the auxiliary motor 35, and further assuming that it may be desired to use 6 volt battery current in the circuit controlled by the governor, I may employ a relay 60 between the governor circuits and the motor energizing circuits. The use of the relay is, however, optional, and any electrician can omit it or provide other power connections as desired.

The general arrangement is such that when the engine reaches the predetermined speed at which it is able to pick up the load represented by belt 8, the governor control switch 23 will be operated in a manner to cause its contactor 24 to swing from engagement with contact 26 to engagement with contact 27. The moving contact 58 of switch 55 being already engaged with contact 57, this will complete a circuit which will energize the motor 35 to operate through the speed reducer 45, the shaft 46 thereby rotating the crank 47 to shift the clutch lever 6 in a clutch engaging direction.

At the same time, the rotation of shaft 46 by the speed reducer will operate the cam or eccentric 49 so that, as the clutch lever 6 reaches its clutch engaging position, the switch 55 will function with a snap action to open abruptly the circuit which energizes the auxiliary motor 35. The opening of this circuit will de-energize solenoid 39, thereby allowing the automatic brake 36 to stop immediately the overrun of the motor, thus holding the prime mover clutch lever 6 in the desired position. All circuits are now open and no current is flowing through any of the control system. Regardless of any slight governor fluctuations, this condition will obtain until the engine speed has dropped below the point at which the engine can carry the load represented by the belt 8. At this point the tension of spring 22 acting on the governor lever 21 will cause such lever to move the contactor 24 of switch 23 back into engagement with the fixed contact 26. The contactor 58 of the other switch 55 being already in engagement with stationary contact 55 of such other switch, the circuit will now again be closed to re-energize motor 35, releasing the brake, and allowing the motor to operate the crank 47 through another 180 degrees, thereby moving the clutch lever to its disengaged position. As the clutch lever approaches its disengaged position, the cam or eccentric 49 of shaft 46 will have reciprocated the rod 51 sufficiently to cause switch 55 to function with snap action to break the circuit through contact 56 and to re-engage the contactor with contact 57. Since contact 47 is de-energized (the circuit thereto being open in switch 23) this operation again causes cessation of operation of the auxiliary motor 35, arresting the clutch lever 6 in its disengaged position and leaving the two three way switches with their circuits completely de-energized but in readiness for further operation upon the next occasion when the engine speed increases to the point where the driven load is to be clutched to the engine.

In each operation the crank 47 moves 180 degrees (this being the amount of movement required in this particular installation). In each operation the clutch lever is moved from engaged position to disengaged position, or vice versa, and is brought to rest precisely at the desired point. In each operation the breaking of the circuit upon movement of the clutch lever to the desired position establishes the proper circuit conditions for a further operation when the clutch lever requires further movement.

It will be apparent that the switch 23 may be manually operated if desired, thus providing remote control for the clutch operator without automatic governor actuation. In any event, the control is electrical; the successive increments of advance are regulated by the opening of an electrical circuit; and the same operation which opens the circuit following one increment of advance resets the device for operation in a successive increment of advance.

I claim:

1. The combination with a prime mover provided with a clutch control lever movable between clutch engaged and clutch disengaged positions, of a governor connected with the prime mover, a three way switch having a contactor connected to receive motion from the governor and provided with a plurality of terminals, said contactor being adapted to close a circuit including one of said terminals above a predetermined engine speed and close a circuit including the other of said terminals below a predetermined engine speed, a clutch operating motor, clutch shifting means operatively connected with said lever and provided with motion transmitting connections from said motor for the shifting of said lever from one position to another in successive increments of motor operation, and circuit connections for energizing said motor including a second three way switch having a contactor connected with said clutch shifting means to be moved in synchronism therewith and terminals adapted alternatively to be contacted and released by said last mentioned contactor, said terminals being electrically connected with the aforesaid terminals of the three way switch first mentioned, whereby the closing of a circuit by the governor actuated contactor of the first mentioned switch will close a circuit through the switch second mentioned for the energization of said motor and the advance of said clutch actuating means for a single increment, said second switch thereupon interrupting the motor energizing circuit and establishing a second circuit including a different terminal of the second mentioned switch for re-energizing said motor when the other terminal of the first mentioned switch is next energized through the operation of said governor.

2. In a device of the character described, the combination with a prime mover having a speed control member adjustable between idling position and operating position, work controlled means for automatically operating said member between said positions, a work operating drive from said prime mover provided with a clutch lever movable between clutch engaged and clutch disengaged positions, a governor connected with said prime mover, and means controlled by said governor for shifting said lever to its engaged position when said engine operates above a predetermined speed and to said disengaged position when said engine operates below a predetermined speed, whereby the work controls the speed of engine operation and the speed of engine operation, in turn, controls work actuation from said engine.

3. In a device of the character described, the combination with a prime mover, of a pump driven thereby, driving connections from the prime mover to the pump including a clutch lever movable between clutch engaging and clutch disengaging positions, a tank arranged to receive liquid from the pump, a float operable by the liquid pumped, a speed control on the prime mover to which the float is operatively connected for the acceleration of the operation of the prime mover when the level of liquid in the tank falls, speed responsive means connected to the prime mover, a clutch operator adapted for actuation in successive increments to move the clutch lever alternately to its respective positions, and means actuated by said speed responsive device for energizing said clutch operator for successive increments of movement.

4. The device of claim 3 in which said last mentioned means includes mechanism for interrupting the movement of said operator upon the completion of a single increment of movement thereof.

5. The device of claim 3 in which said last mentioned means includes mechanism for de-energizing said clutch operator upon the completion of a single increment of movement thereof, and a brake applicable to said clutch operator for bringing said operator to rest upon its de-energization.

6. A device of the character described, comprising the combination with a speed responsive device, of a three way switch having an operating lever with which said device has a lost motion connection, said switch having an input terminal and a plurality of output terminals, a second three way switch having a plurality of input terminals respectively connected with the output terminals of the switch first mentioned and having an output terminal, a clutch actuating motor provided with circuit means for its energization from the output terminal of the second three way switch, a clutch operator provided with driving connections from said motor, a clutch lever having engaged and disengaged positions and provided with a driving connection from said operator, said operator including a motion transmitting connection for the actuation of the second three way switch to provide alternatively for connection of the output terminal thereof to alternate input terminals thereof, the circuit to said motor being de-energized each time the connection of one of said input terminals to the output terminal of the second three way switch is broken, and an alternative circuit for the energization of said motor being concurrently established subject to the further operation of the three way switch first mentioned, whereby said clutch lever is shifted from one position to another in successive increments dependent upon said speed responsive device.

7. In a device of the character described, the combination with a clutch operator having a unidirectional driving motor and a clutch operating means comprising a crank connected to receive motion in one direction of rotation from the motor, of a three way switch in circuit energizing connection with the motor and having an actuating device connected to be moved to and fro by said clutch operator in synchronism with the movement of said clutch operating means, and a remote three way switch in operative circuit connection with the three way switch first mentioned and comprising means for initiating increments of motor operation broken at the conclusion of each increment of operation by the switch first mentioned.

8. The device of claim 7 in which said operator and motor include motion transmitting connections provided with a brake means biased for engagement to retard said connections and having an electromagnetic brake disengaging means operatively connected to be energized with the energization of said motor, whereby said brake is disengaged when said motor is operative.

9. The combination with a prime mover having a clutch and a clutch control lever movable between clutch engaged and clutch disengaged positions, of a governor connected with the prime mover, the prime mover being adapted for continuous operation at speeds varying between an idling speed and a working speed, and means for engaging the clutch at the working speed of the prime mover and disengaging the clutch at the idling speed thereof, said means comprising a three-way switch having a plurality of terminal contacts and a moving contactor connected to receive motion from the governor, a second three-way switch having terminal contacts and a moving contact in operative connection with said clutch control lever, a clutch operating electric motor having a rotatable armature shaft, a crank in operative connection with said lever and a moving contactor of the last mentioned three-way switch, a speed reducing drive between the armature shaft and the crank, said crank in one position being adapted to shift said clutch control lever to engage the clutch and in another position to shift said lever to disengage the clutch, and circuit connections to said electric motor controlled by respective switches, the second mentioned switch comprising means for interrupting a given circuit to said motor when said crank reaches one of its aforesaid positions and establishing a different circuit to said motor, and the first mentioned three-way switch comprising means for selectively closing the motor circuit established in each movement of the movable contactor of the three-way switch second mentioned, whereby said electric motor in successive increments of operation alternately engages and disengages the clutch and thereupon breaks its own circuit.

WILLIAM L. CARLSON.